United States Patent
Lindskog et al.

(10) Patent No.: US 6,603,750 B1
(45) Date of Patent: Aug. 5, 2003

(54) REHASH TIMER FOR PACKET DATA COMMUNICATIONS

(75) Inventors: Jan Lindskog, Pixbo (SE); Gunnar Rydnell, Rävlanda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/397,508

(22) Filed: Sep. 17, 1999

Related U.S. Application Data

(60) Provisional application No. 60/103,576, filed on Oct. 9, 1998.

(51) Int. Cl.[7] .................................................. H04Q 7/00
(52) U.S. Cl. ...................... 370/329; 370/330; 370/348; 370/442; 455/450; 455/452
(58) Field of Search ................................ 370/442, 444, 370/329, 330, 336, 337, 347, 348; 455/450, 452, 502; 709/248, 400; 713/400

(56) References Cited

U.S. PATENT DOCUMENTS

| 4,887,265 | A |   | 12/1989 | Felix |
| 5,175,867 | A |   | 12/1992 | Wejke et al. |
| 5,353,332 | A | * | 10/1994 | Raith et al. ................ 455/455 |
| 5,502,725 | A | * | 3/1996 | Pohjakallio ................ 370/337 |
| 5,729,531 | A | * | 3/1998 | Raith et al. ................ 370/252 |
| 5,745,523 | A |   | 4/1998 | Dent et al. |
| 5,995,829 | A | * | 11/1999 | Broderick ................ 455/418 |
| 6,016,428 | A | * | 1/2000 | Diachina et al. ............ 455/435 |

FOREIGN PATENT DOCUMENTS

| WO | WO97/15153 | 4/1997 |

* cited by examiner

*Primary Examiner*—William Trost
*Assistant Examiner*—Sharad Rampuria

(57) ABSTRACT

The present invention provides a rehash timer in both the mobile station and the base station in order to synchronize the channel selection process in a radio communication system and to avoid the need to store long rehashing lists in the base station.

8 Claims, 2 Drawing Sheets

REHASH TIMER FOR PACKET DATA COMMUNICATIONS

RELATED APPLICATION

This application is related to, and claims priority from, U.S. Provisional Patent Application Serial No. 60/103,576, entitled "Rehash Timer", filed on Oct. 9, 1998, the disclosure of which is incorporated here by reference.

BACKGROUND

The present invention relates generally to radio communication systems and, more particularly, to techniques and structures for determining a channel on which a mobile station is camped.

In North America, digital communication and multiple access techniques such as TDMA are currently provided by a digital cellular radiotelephone system called the digital advanced mobile phone service (D-AMPS), some of the characteristics of which are specified in the interim standard TIA/EIA/IS-54; "Dual-Mode Mobile Station-Base Station Compatibility Standard", published by the Telecommunications Industry Association and Electronic Industries Association (TIA/EIA), which is expressly incorporated herein by reference. Because of a large existing consumer base of equipment operating only in the analog domain with frequency-division multiple access (FDMA), TIA/EIA/IS-54 is a dual-mode (analog and digital) standard, providing for analog compatibility together with digital communication capability. For example, the TIA/EIA/IS-54standard provides for both FDMA analog voice channels (AVC) and TDMA digital traffic channels (DTC). The AVCs and DTCs are implemented by frequency modulating radio carrier signals, which have frequencies near 800 megahertz (MHz) such that each radio channel has a spectral width of 30 kilohertz (KHz).

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user.

The successive time slots assigned to the same user, which are usually not consecutive time slots on the radio carrier, constitute the user's digital traffic channel, which may be considered a logical channel assigned to the user. As described in more detail in TIA/EIA/IS-136, digital control channels (DCCHs) can also be provided for communicating control signals, and such a DCCH is a logical channel formed by a succession of usually non-consecutive time slots on the radio carrier.

The systems specified by the TIA/EIA/IS-54 and TIA/EIA/IS-136 (now ANSI136) standards are circuit-switched technology, which is a type of "connection-oriented" communication that establishes a physical call connection and maintains that connection for as long as the communicating end-systems have data to exchange. The direct connection of a circuit switch serves as an open pipeline, permitting the end-systems to use the circuit for whatever they deem appropriate. While circuit-switched data communication may be well suited to constant-bandwidth applications, it is relatively inefficient for low-bandwidth and "bursty" applications.

Packet-switched technology, which may be connection-oriented (e.g., X0.25) or "connectionless" (e.g., the Internet Protocol, "IP"), does not require the set-up and tear-down of a physical connection, which is in marked contrast to circuit-switched technology. This reduces the data latency and increases the efficiency of a channel in handling relatively short, bursty, or interactive transactions. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers", stationed between the communicating end-systems make decisions about the most appropriate route to take on a per packet basis. Routing decisions are based on a number of characteristics, including: least-cost route or cost metric; capacity of the link; number of packets waiting for transmission; security requirements for the link; and intermediate system (node) operational status.

Packet transmission along a route that takes into consideration path metrics, as opposed to a single circuit set up, offers application and communications flexibility. It is also how most standard local area networks (LANs) and wide area networks (WANs) have evolved in the corporate environment. Packet switching is appropriate for data communications because many of the applications and devices used, such as keyboard terminals, are interactive and transmit data in bursts. Instead of a channel being idle while a user inputs more data into the terminal or pauses to think about a problem, packet switching interleaves multiple transmissions from several terminals onto the channel.

Packet data provides more network robustness due to path independence and the routers' ability to select alternative paths in the event of network node failure. Packet switching, therefore, allows for more efficient use of the network lines. Packet technology offers the option of billing the end user based on amount of data transmitted instead of connection time. If the end user's application has been designed to make efficient use of the air link, then the number of packets transmitted will be minimal. If each individual user's traffic is held to a minimum, then the service provider has effectively increased network capacity.

Packet networks are usually designed and based on industry-wide data standards such as the open system interface (OSI) model or the TCP/IP protocol stack. These standards have been developed, whether formally or de facto, for many years, and the applications that use these protocols are readily available. The main objective of standards-based networks is to achieve interconnectivity with other networks. The Internet is today's most obvious example of such a standards-based network pursuit of this goal.

In a mobile packet data system, having a reservation-based medium access control (MAC) protocol over the airlink using acknowledged transmission, both low data latency and effective airlink bandwidth utilization are difficult to meet. One important technique used to address latency and efficient bandwidth utilization is load spreading, i.e., dynamically spreading the packets to be transmitted over various transmission resources. With the new standards currently being settled for integrated voice and packet data services in ANSI-136 systems, techniques will be established for spreading the traffic load not only within packet data channels on a single carrier, but also between packet data channels on different carriers.

For example, in systems including multiple packet data control channels (PCCH), on one or plural carriers, each mobile station (MS), through the use of a default hashing algorithm, chooses which PCCH it shall camp upon. More specifically, an inactive (idle) MS, performing a cell re-selection to a new cell, reads a beacon PCCH. On the beacon PCCH, information regarding PCCHs supported in the cell is provided. By using a default hashing algorithm the MS will determine which PCCH it shall use for its camping. The default hashing algorithm may, for example, determine the PCCH based on the least significant bit of the mobile station's identification number. As a result, the mobile tunes to a selected PCCH and reads its paging channels.

Using this approach, the mobile stations in a cell are evenly distributed over the PCCHs supported by the cell. However, the generated traffic on each PCCH will vary depending on, for example, whether many of the MSs assigned thereto are active in a data transaction or whether many of the MSs assigned thereto are in a sleep mode and, therefore, reading only the paging slots.

In order to spread the traffic load as it changes due to changes in MS activity, the base station (BS) may use Channel Reassignment messages in order to force a mobile station to rehash to another PCCH or to order the mobile to move to a packet traffic channel (PTCH). If a mobile station is directed to tune to a PTCH, the mobile station will utilize the PTCH for the duration of the transaction and then return to the original PCCH and start a battery preservative procedure. If a mobile station is directed to tune to a PCCH on a different carrier, the mobile station utilizes the new PCCH for the transaction and optionally stays on the new PCCH after completion of the transaction.

In all of the above situations, the BS is required to remember which mobile stations have been ordered to rehash to another PCCH. As a result, rehashing lists in BSs are commonly quite long. Since inactive MSs are not required to send notifications to the network when entering a new cell (if within the same routing area), the BS ordered to page an MS has no way of knowing whether the MS is currently on a PCCH determined by the default hashing method or a PTCH/PCCH determined by a channel reassignment message.

Consider the following example which serves to better illustrate the problem confronting a base station seeking to page a mobile station which is assigned to a channel as described above. Suppose that a mobile station within a first cell, having channels A and B, uses its default-hashing algorithm to determine the channel to camp on. Suppose further that the default-hashing algorithm determines that the mobile station should camp on channel A. At some later time, the base station within the first cell transmits a Channel Reassignment message to the mobile station telling the mobile station to switch to channel B, due to, for example, the amount of traffic on channel A. If the mobile station then moves to another cell and subsequently moves back to the first cell, it will again use its default-hashing algorithm to choose channel A. When the base station wants to page the mobile station, it does not know whether the mobile station is camped on channel A (because it moved to another cell and then back to the original cell) or channel B (because the mobile stayed within the cell). In order to avoid this problem, the base station could page the mobile station on both channels, but this would increase paging traffic in the cell. Since bandwidth is limited, this is an undesirable solution.

Accordingly, it would be desirable to provide techniques and systems whereby a base station can more readily determine a channel on which to page a mobile station in a packet data communication system.

SUMMARY

The present invention seeks to overcome the above-identified deficiencies by providing a rehash timer in both the mobile station and the base station in order to synchronize the channel selection process and to avoid the need to store long rehashing lists in the base station.

According to an exemplary embodiment of the present invention, a mobile station, which is camping on a first channel, receives a command from a particular base station to rehash to a second channel. The mobile station rehashes to the new channel, sends a confirmation message indicating the new channel to which it is listening and starts its rehash timer. Until the rehash timer expires, the mobile station will continue to use the second channel for communicating with that base station, even if it leaves the cell and subsequently returns. After the mobile's rehash timer expires, if it needs to listen to that particular base station again, it will use the default hashing algorithm again to determine the appropriate (e.g., first) channel.

From the base station's perspective, according to exemplary embodiments of the present invention, the base station receives the confirmation message from the mobile station which identifies the second (rehashed) channel to which the mobile station is now listening. At this time, the base station will store the new channel in a rehash list for later reference (e.g., if it needs to page the mobile station) and start its own rehash timer, which timer is associated with that particular mobile station. Until the base station's rehash timer expires, the base station will page that particular mobile station using the channel stored in the rehash list. After the timer expires, the base station will use the default hashing algorithm to identify the appropriate (default) channel on which to communicate with the camping mobile station.

BRIEF DESCRIPTION OF THE DRAWINGS

The above objects and features of the present invention will be more apparent from the following description of the preferred embodiments with reference to the accompanying drawings, wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 1:
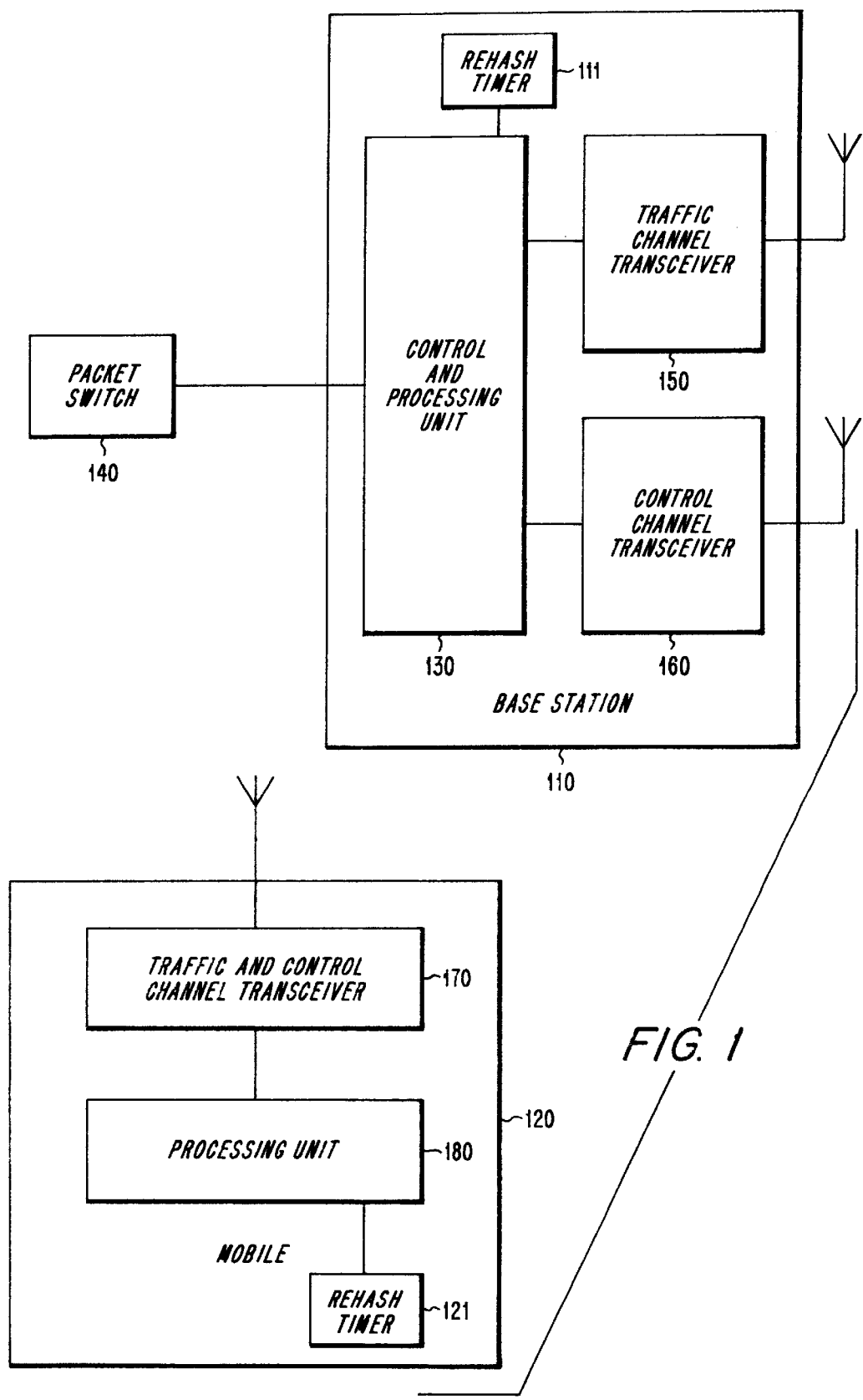
FIG. 1 is a block diagram of an exemplary cellular mobile radiotelephone system, including an exemplary base station and mobile station employing the rehash timers according to the present invention.

FIG. 1 illustrates an exemplary cellular mobile radiotelephone system in which the present application can be implemented, including an exemplary base station 110 and mobile station 120 employing the rehash timers of the present invention. The base station includes a control and processing unit 130 which is connected to packet switch 140. General aspects of cellular radiotelephone systems are known in the art, as described by the above-cited U.S. patent applications and by U.S. Pat. No. 5,175,867 to Wejke et al., entitled "Neighbor-Assisted Handoff in a Cellular Communication System," and U.S. Pat. No. 5,745,523 entitled "Multi-mode Signal Processing," which was filed on Oct. 27, 1992, both of which are incorporated in this application by reference.

The base station 110 handles a plurality of packet traffic channels through a packet traffic channel transceiver 150, which is controlled by the control and processing unit 130. Also, each base station includes a packet control channel transceiver 160, which may be capable of handling more than one packet control channel. The packet control channel transceiver 160 is controlled by the control and processing unit 130. The packet control channel transceiver 160 broadcasts control information over the packet control channel of the base station or cell to mobiles locked to that packet control channel. It will be understood that the transceivers 150 and 160 can be implemented as a single device, like the traffic and control transceiver 170, for use with DCCHs and DTCs that share the same radio carrier frequency. The base station 110 also employs a rehash timer 111, the operation of which will be described in detail below.

The mobile station 120 receives the information broadcast on a packet control channel at its traffic and control channel transceiver 170. Then, the processing unit 180 evaluates the received packet control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System," which is incorporated in this application by reference. The mobile station also employs a rehash timer 121.

Figure 2:
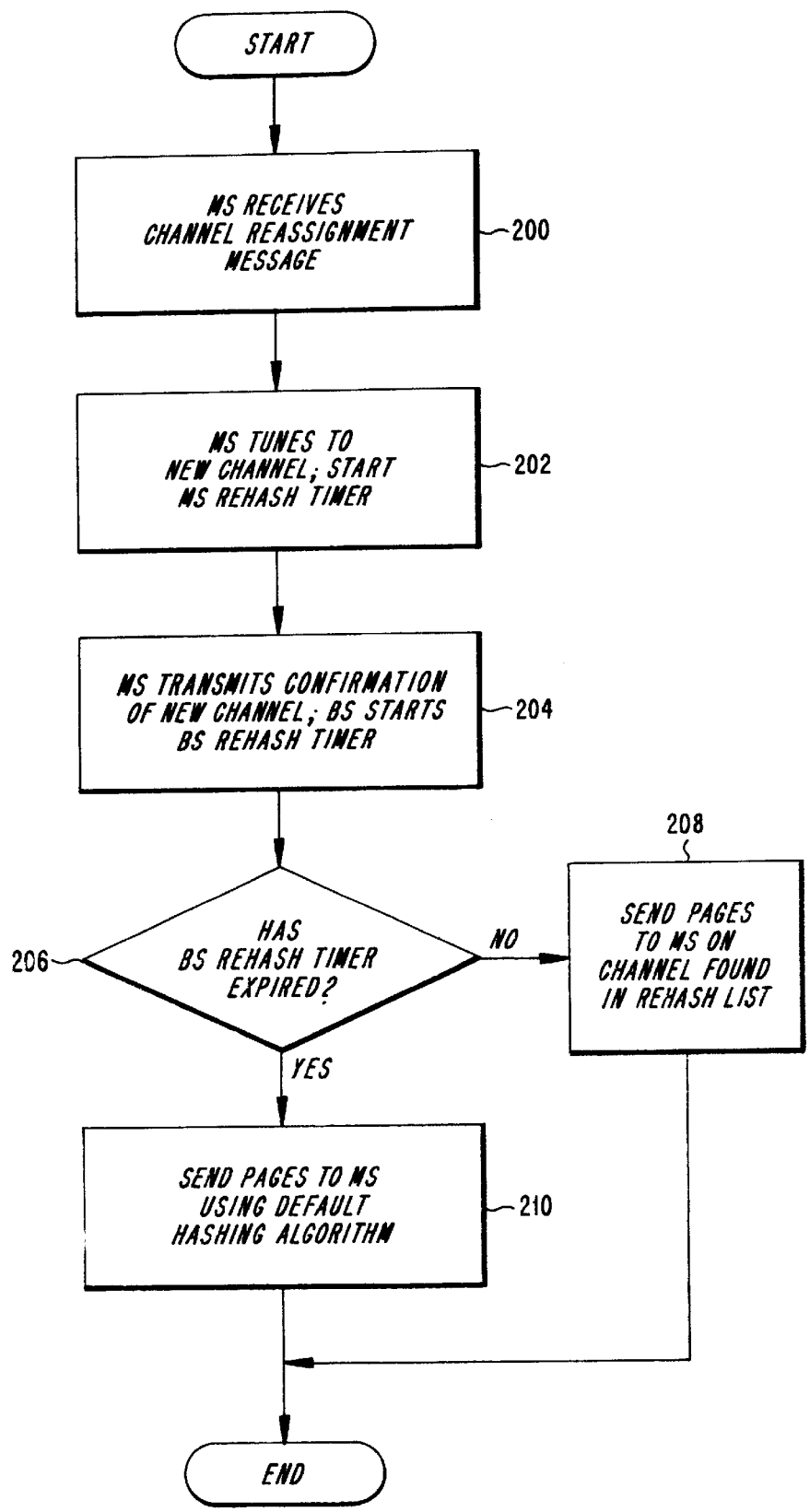
FIG. 2 is a flow chart depicting a method for determining a channel on which a mobile station is camping according to an exemplary embodiment of the present invention.

According to exemplary embodiments of the present invention, the rehash timers 111 and 121 are used to assist the system in determining on which channel to page the mobile station and to resolve the uncertainty regarding channel assignments described above. An exemplary method for purging a rehash list in the base station 110 with the aid of these rehash timers will now be described with respect to the flowchart of FIG. 2.

Starting at step 200, assume that in an exemplary mobile terminated data transaction, the base station 110 transmits a Begin frame, including a Channel Reassignment message to the mobile station 120 indicating that, due to, for example, the load on the channel on which the mobile station 120 is camped, the mobile station is to tune to a new channel (e.g., a new PCCH). One skilled in the art will appreciate, as indicated above, that the channel on which the mobile station is camped was originally selected via a default-hashing algorithm. The mobile station confirms receipt of the Channel Reassignment message according to, for example, the technique described in copending, commonly assigned U.S. application Ser. No. 09/210,595, entitled "Reassignment Handshake", the entirety of which is incorporated here by reference. The mobile station 120 then tunes (step 202) to its new channel as identified in the Channel Reassignment message and starts its rehash timer 121. After the mobile station 120 tunes to its new channel, it can be polled by the base station 110 to transmit a confirmation message to the base station 110 including the identity (e.g., frequency, timeslot, channel number, spreading code, or combination thereof) of its new channel.

The base station 110, upon receipt of the confirmation message, starts its rehash timer 111 (step 204) and stores the location (i.e., the new channel) of the mobile station 120 in a rehash list in a memory (not shown). Alternatively, the base station may start its rehash timer 111 when it transmits the Channel Reassignment message. Those skilled in the art will appreciate that the selection of a particular triggering act to initiate the base station's rehash timer 111 will depend upon design and implementation details and that it is more significant that the base station start its rehash timer 111 associated with mobile station 120 at approximately the same time that mobile station 120 starts its rehash timer 121.

While the rehash timer 111 is counting, the base station 110 will page the mobile station 120 using the channel identified in the rehash list (steps 206, 208). Upon expiration of the timer 111, the base station 110 terminates the mobile station's entry in the rehash list and thereafter uses the default-hashing method (step 210) to determine which channel the mobile station 120 is listening to, e.g., if the base station 110 needs to page mobile station 120. Moreover, the mobile station 120, upon expiration of the rehash timer 121, will rehash using the default-hashing method and again change channels. According to exemplary embodiments of the present invention, the mobile station 120 does not reset its rehash timer 121 upon cell re-selections (i.e., those instances where the mobile station switches to another cell and then back to the original cell).

Rehashing techniques according to the present invention provide the advantage that even if a mobile station moves between cells and returns to a cell where it was previously ordered to rehash, it will use the PCCH it was ordered to rehash to (unless its rehash timer has expired), thus mitigating the base station's decision on which channel to page the mobile station. If an entry for a mobile station 120 exists in the rehash table, the base station 110 uses the PCCH given from the rehash entry. Otherwise, the base station 110 uses the default hashing algorithm to identify the mobile station 120's PCCH. The present invention also avoids the need to store long rehash lists in the base station since a mobile station's entry is eliminated after the rehash timer 111 expires. Of course, a base station will need to employ multiple timers to track corresponding mobile stations. Likewise, a mobile station should have a plurality of rehash timers to be able to track different cells that it enters. If, however, the timer is set to a low value, then a lower number of rehash timers would be needed. The particular number of timers employed by a mobile station may vary, however it is likely that each mobile station may include two or more such timers.

In addition to their usage for enabling the system to determine on what channel to page a mobile station, rehash timers according to the present invention also play a role in providing efficient load sharing in packet communication systems. For example, as mentioned above, mobile stations may initially be reassigned in order to redistribute the communication load across the available communication resources. Although the preceding exemplary embodiments describe the case where the mobile station automatically reverts to its default channel when its rehash timer expires, there may be circumstances associated with the provision of efficient load sharing wherein the mobile station should instead be required to stay on its rehashed channel. Thus, the usage of rehash timers according to the present invention may be optionally invoked, e.g., by providing another information element in the Channel Reassignment message that informs the mobile station whether it should start its rehash timer or not. Alternatively, the Channel Reassignment message can include a timer value that the mobile station can load into its rehash timer so that the system controls when the mobile station may return to its default channel. This permits the system to exercise greater load sharing control in systems employing rehash timers according to the present invention.

The foregoing has described the principles, preferred embodiments and modes of operation of the present invention. However, the invention should not be construed as being limited to the particular embodiments discussed above. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for transmitting packet data between a base station and a mobile station in a radio communication system, said method comprising the steps of:

determining a first channel on which information can be exchanged between said mobile station and said base station;

transmitting on said first channel, from said base station to said mobile station, a Channel Reassignment message indicating that said mobile station is to rehash to a new channel;

transmitting, from said mobile station to said base station, a confirmation message indicating receipt of said Channel Reassignment message;

starting a rehash timer in said mobile station;

starting, in response to said confirmation message, a rehash timer in said base station;

rehashing to said new channel; and wherein, upon expiration of said rehash timers, said mobile station and said base station rehash back to said first channel.

2. The method of claim 1, wherein said step of determining further comprises:

using a default hashing algorithm to determine said first channel.

3. A method for determining, by a radiocommunication system, a channel on which a mobile station is camping, the method comprising the steps of:

providing a default algorithm by which said mobile station is assigned to a default channel;

selectively reassigning said mobile station from said default channel to another channel;

adding an association between said mobile station and said another channel to a list stored in said system;

starting a timer;

removing said association from said list when said timer expires; and determining said channel on which said mobile station is camping using at least one of said list and said default algorithm.

4. The method of claim 3, wherein said step of providing a default algorithm further comprises the step of:

providing a hashing algorithm based on at least a portion of an identification number of said mobile station.

5. The method of claim 3, wherein said step of selectively reassigning further comprises the step of:

transmitting a channel reassignment message from said radiocommunication system to said mobile station, which channel reassignment message includes an identification of a hashing algorithm to be used by said mobile station to determine said another channel.

6. The method of claim 3, wherein said step of starting a timer further comprises the step of:

receiving a confirmation message from said mobile station and starting said timer in response thereto.

7. A method for determining, by a mobile station, a channel associated with a base station to which said mobile station is to be listening, the method comprising the steps of:

receiving from said base station a Channel Reassignment message indicating that said mobile station is to rehash to a new channel;

switching from listening to a first channel to listening to said new channel, said new channel also being transmitted by said base station;

transmitting, from said mobile station to said base station, a confirmation message indicating receipt of said Channel Reassignment message;

starting a rehash timer in said mobile station; and upon expiration of said rehash timers, said mobile station and said base station rehash back to said first channel.

8. A base station comprising:

a transceiver for transmitting and receiving radio signals;

a processor for controlling said transceiver; and a memory, said transceiver, processor and memory operative in combination to:

transmit a Channel Reassignment message from said base station to a mobile station, said message indicating that said mobile station is to rehash from a first channel to a new channel;

receive from said mobile station a confirmation message indicating receipt of said Channel Reassignment message;

start, in response to said confirmation message, a rehash timer in said base station; and upon expiration of said rehash timer, said mobile station and said base station rehash back to said first channel.

* * * * *